(12) United States Patent
Sekharan et al.

(10) Patent No.: US 11,663,231 B2
(45) Date of Patent: May 30, 2023

(54) ACCESS SHARING TO DATA FROM CLOUD-BASED ANALYTICS ENGINE

(71) Applicant: Business Objects Software Limited, Dublin (IE)

(72) Inventors: Satishkumar Sekharan, Coquitlam (CA); Yuru Wang, Coquitlam (CA)

(73) Assignee: Business Objects Software Limited, Dublin (IE)

( * ) Notice: Subject to any disclaimer, the term of this patent is extended or adjusted under 35 U.S.C. 154(b) by 384 days.

(21) Appl. No.: 16/702,424

(22) Filed: Dec. 3, 2019

(65) Prior Publication Data

US 2021/0165801 A1 Jun. 3, 2021

(51) Int. Cl.
*G06F 16/25* (2019.01)
*G06F 16/955* (2019.01)
*G06N 20/00* (2019.01)
*G06F 16/2452* (2019.01)
*G06F 16/28* (2019.01)
*G06F 9/30* (2018.01)

(52) U.S. Cl.
CPC ........ *G06F 16/252* (2019.01); *G06F 9/30043* (2013.01); *G06F 16/24524* (2019.01); *G06F 16/288* (2019.01); *G06F 16/955* (2019.01); *G06N 20/00* (2019.01)

(58) Field of Classification Search
USPC .......................................................... 707/803
See application file for complete search history.

(56) References Cited

U.S. PATENT DOCUMENTS

| 2007/0244650 | A1* | 10/2007 | Gauthier | G06Q 10/10 |
| | | | | 708/445 |
| 2012/0017165 | A1* | 1/2012 | Gardner | H04L 41/22 |
| | | | | 715/771 |
| 2012/0078859 | A1* | 3/2012 | Vaitheeswaran | G06F 16/951 |
| | | | | 707/693 |
| 2012/0324327 | A1* | 12/2012 | Vishria | G06F 16/9566 |
| | | | | 715/208 |
| 2014/0173411 | A1* | 6/2014 | Sekharan | G06F 40/154 |
| | | | | 715/234 |
| 2015/0135056 | A1* | 5/2015 | Sekharan | G06F 16/972 |
| | | | | 715/234 |

(Continued)

*Primary Examiner* — Hosain T Alam
*Assistant Examiner* — Robert F May
(74) *Attorney, Agent, or Firm* — Mintz Levin Cohn Ferris Glovsky and Popeo, P.C.

(57) ABSTRACT

A method for sharing access to data from a cloud-based analytics engine may include receiving, at a first client, a message from a second client. The message may include an image of a data presentation and metadata associated with the data presentation. The first client may respond to a selection of the image of the data presentation by accessing the cloud-based analytics engine to retrieve, based on the metadata associated with the data presentation, data associated with the data presentation. The data presentation may generated for display at the first client based on the data retrieved from the cloud-based analytics engine. The data presentation displayed at the first client may be interactive to enable an application of one or more modifications to the data presentation displayed at the first client. Related systems and articles of manufacture are also provided.

20 Claims, 10 Drawing Sheets

(56) References Cited

U.S. PATENT DOCUMENTS

| | | | | |
|---|---|---|---|---|
| 2015/0288760 A1* | 10/2015 | Thomas | ................ | H04L 67/55 |
| | | | | 709/203 |
| 2015/0341176 A1* | 11/2015 | Staykov | ............... | H04L 9/3247 |
| | | | | 713/176 |
| 2017/0357679 A1* | 12/2017 | Kumar | .................... | G06F 16/22 |
| 2018/0067734 A1* | 3/2018 | Prasad | ............... | G06F 11/3438 |

* cited by examiner

ACCESS SHARING TO DATA FROM CLOUD-BASED ANALYTICS ENGINE

TECHNICAL FIELD

The subject matter described herein relates generally to database processing and more specifically to a cloud-based analytics engine operating on data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for sharing access to data from a cloud-based analytics engine. In one aspect, there is provided a system. The system may include at least one data processor and at least one memory. The at least one memory may store instructions that result in operations when executed by the at least one data processor. The operations may include: receiving, at a first client, a message from a second client, the message including an image of a data presentation and metadata associated with the data presentation; responding, by the first client, to a selection of the image of the data presentation by at least accessing a cloud-based analytics engine to retrieve at least a portion of data associated with the data presentation, the cloud-based analytics engine being accessed based at least on the metadata associated with the data presentation; and generating, based at least on the data retrieved from the cloud-based analytics engine, the data presentation for display at the first client, the data presentation displayed at the first client being interactive to enable an application of one or more modifications to the data presentation displayed at the first client.

In some variations, one or more features disclosed herein including the following features may optionally be included in any feasible combination. The data presentation may be generated at the second client using data retrieved from the cloud-based analytics engine. The metadata included in the message may enable the first client to access the cloud-based analytics engine to retrieve a same data used to generate the data presentation at the second client.

In some variations, the metadata may include a query associated with the data presentation. The data presentation may be generated at the second client at least by the second client executing the query to retrieve, from the cloud-based analytics engine, at least the portion of the data associated with the data presentation.

In some variations, the data associated with the data presentation may be stored in a database coupled with the cloud-based analytics engine. The metadata may include an identifier of the database.

In some variations, the metadata may include a uniform resource identifier (URI), a uniform resource locator (URL), and/or a uniform resource name (URN) of the cloud-based analytics engine.

In some variations, the first client may include a plugin configured to respond to selection of the image of the data presentation by accessing the cloud-based analytics engine and generating the data presentation for display at the first client. The plugin may be further configured to authenticate the first client and/or a user associated with the first client prior to accessing the cloud-based analytics engine to retrieve the portion of the data associated with the data presentation.

An indication to apply a first modification to the data presentation displayed at the first client may be received at the first client. The first modification may be applied to the data presentation displayed at the first client in response to the indication. The first modification may be sent to the cloud-based analytics engine such that a history of the data presentation is updated to include the first modification. The history of the data presentation including the first modification and a second modification that a second user at the second client applied to the data presentation prior to sending the data presentation to the first client may be displayed at the first client.

In some variations, the data presentation may be associated with a title generated based at least on a query configured to retrieve the data associated with the data presentation. The indication may include one or more modifications to the title of the data presentation. One or more dimensions included in the data presentation may be linked to one or more keywords included in a text of the message. The one or more modification may modify the one or more keywords linked to the one or more dimensions of the data presentation.

In some variations, a request to extract data from a content from a third party source may be received at the first client. In response to the request, the data may be extracted from the content from the third party source. The extracted data may be exported to the cloud-based analytics engine.

In some variations, the extracted data may include one or more named entities included in the content from the third party source. The extracting of the data may include applying one or more machine learning models to identify the one or more named entities. The extracted data may further include an intent of the content from the third party source. The extracting of the data may include applying the one or more machine learning models to identify, based at least on the one or more named entities, the intent of the content from the third party source. The one or more machine learning model may be jointly trained to identify the one or more named entities and the intent of the content from the third party source.

In some variations, the extracting of the data may include extracting one or more keywords present in the content from the third party source. The extracting of the data may include inferring a metadata associated with the content from the third party source. The extracting of the data may include extracting one or more data values from a structured data and/or a semi-structured data include in the content from the third party source.

In another aspect, there is provided a method for sharing access to data from a cloud-based analytics engine. The method may include: receiving, at a first client, a message from a second client, the message including an image of a data presentation and metadata associated with the data presentation; responding, by the first client, to a selection of the image of the data presentation by at least accessing a cloud-based analytics engine to retrieve at least a portion of data associated with the data presentation, the cloud-based analytics engine being accessed based at least on the metadata associated with the data presentation; and generating, based at least on the data retrieved from the cloud-based analytics engine, the data presentation for display at the first client, the data presentation displayed at the first client being interactive to enable an application of one or more modifications to the data presentation displayed at the first client.

In another aspect, there is provided a computer program product that includes a non-transitory computer readable storage medium. The non-transitory computer-readable storage medium may include program code that causes operations when executed by at least one data processor. The operations may include: receiving, at a first client, a message from a second client, the message including an image of a data presentation and metadata associated with the data presentation; responding, by the first client, to a selection of the image of the data presentation by at least accessing a cloud-based analytics engine to retrieve at least a portion of data associated with the data presentation, the cloud-based analytics engine being accessed based at least on the metadata associated with the data presentation; and generating, based at least on the data retrieved from the cloud-based analytics engine, the data presentation for display at the first client, the data presentation displayed at the first client being interactive to enable an application of one or more modifications to the data presentation displayed at the first client.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to sharing access to data from a cloud-based analytics engine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
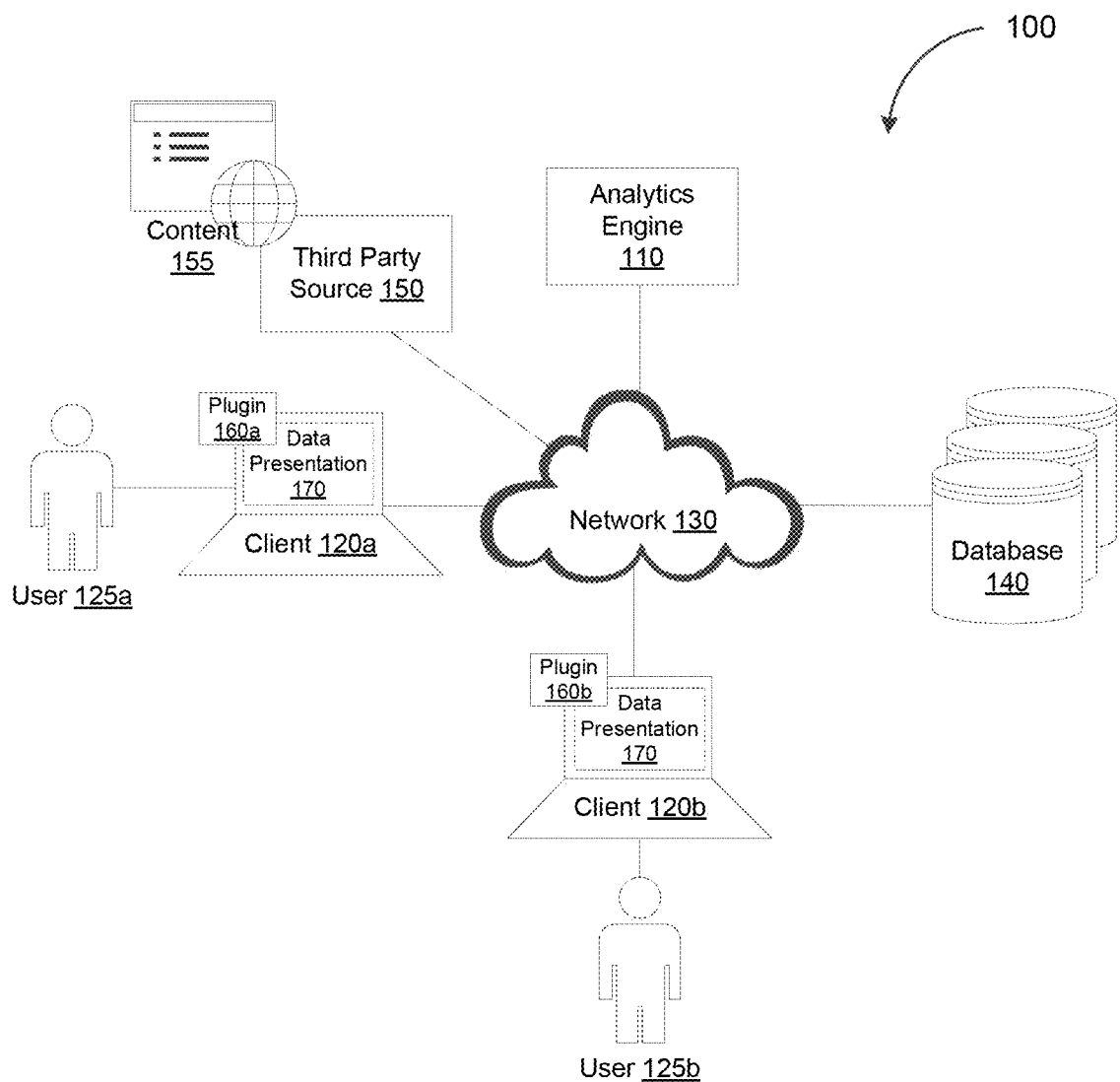
FIG. 1 depicts a system diagram illustrating an analytics system, in accordance with some example embodiments.

A cloud-based analytics engine may provide a variety of functionalities for accessing data stored in a database. For example, a user at a client may interact with the cloud-based analytics engine in order to create a data presentation that provides a visual representation of at least a portion of the data stored in the database. Examples of the data presentation may include a chart, a graph, a table, a diagram, and/or the like. In addition to accessing data through the cloud-based analytics engine, the user may access, at the client, data available from one or more third party sources. Accordingly, in some example embodiments, the client may include a plugin configured to create a dataset that includes data extracted from the one or more third party sources. The plugin may be a software add-on to an application associated with the cloud-based analytics engine. For instance, the plugin may provide one or more additional features to the application including, for example, detecting and responding to events that may require interaction with the cloud-based analytics engine. As such, instead of interacting with the cloud-based analytics engine via the application, the plugin may detect one or more actions performed by the user at the client and respond to these actions by at least interacting with the cloud-based analytics engine.

For example, in some example embodiments, the plugin may detect the user at the client interacting with one or more third party sources of data such as, for example, the user accessing a webpage via a web browser at the client and/or the like. The plugin may respond to the interaction by at least extracting, from the one or more third party sources, structured data residing in a fixed field within a record or a field as well as semi-structured that are not organized in accordance to a data model. For instance, the plugin may be configured to operate on the data displayed at the client as part of the webpage. The plugin may further export, to the cloud-based analytics engine and the corresponding database, the dataset including the data extracted from the one or more third party sources such that the same dataset may be accessible to other clients via the cloud-based analytics engine. In doing so, the plugin may obviate the user having to interact with the application directly in order to extract and export the data from the third party sources to the cloud-based analytics engine.

In some example embodiments, the plugin may be configured to generate the dataset to include a variety of data from the one or more third party sources including, for example, keywords, named entities, custom entities, intent, data values, metadata, and/or the like. Accordingly, in order to create the dataset with data from the one or more third party sources, the plugin may be configured to search for tables included in the data from the one or more third party sources as well as infer metadata associated with the data from the one or more third party sources. Furthermore, the plugin may apply one or more machine learning models trained to detect entities (e.g., named entities as well as custom entities) present in the data from the one or more third party sources. An entity may refer an object (or an instance of an object) that can be denoted with a proper name such as, for example, a person, a location, an organization, a product, and/or the like. Alternatively and/or additionally, the plugin may further apply one or more machine learning models trained an intent associated with the data extracted from the one or more third party sources.

In some example embodiments, the plugin may be further configured to generate a user interface, which may be presented at the client to enable a user at the client to interact with the cloud-based analytics engine. The user at the client may interact with the cloud-based analytics engine to access data stored in the database including the data extracted from the one or more third party sources. For example, the user interface may display, for example, a selection of queries (e.g., natural language queries, structured query language (SQL) queries, and/or the like) for retrieving and/or manipulating at least a portion of the data stored in the database. The plugin may execute the query selected by the user in order to retrieve, from the database, at least a portion of the data stored in the database including, for example, the data extracted from the one or more third party sources. Moreover, the plugin may update the user interface to display a data presentation generated based on the data retrieved from the database. The plugin may associate the data presentation with a title generated based at least on the underlying query. The user at the client may modify the data presentation such as, for example, the measures, dimensions, type of data presentation, filters, and/or sort order associated with the data presentation. At least some modifications to the data presentation may be made in response to the user at the client modifying the title of the data presentation. A history of the data presentation, which include the modifications applied to the data presentation, may be maintained by the plugin and saved to the cloud-based analytics engine for subsequent sharing with other users.

In some example embodiments, the data presentation, including the history of modifications applied to the data presentation, may be shared with users at one or more other clients. For instance, sharing the data presentation with another client may provide the other client access to the underlying data at the cloud-based analytics engine which, as noted, may include the data extracted from the one or more third party sources. As such, the same data presentation may also be displayed at other clients. Furthermore, user at other clients may interact with the same data presentation to apply additional modifications changing, for example, the measures, dimensions, type of data presentation, filters, and/or sort order associated with the data presentation.

In some example embodiments, the user at the client may share the data presentation with users at other clients by at least sending, to the other clients, the data presentation as part of a message. For example, the data presentation may be sent to the other clients in an email, an in-app message, a web-based message, a multimedia message service (MMS) message, an enhanced messaging service (EMS) message, and/or the like. The message may include an image of the data presentation and embedded reference to cloud-based analytics engine from where additional metadata may be retrieved. To lend interactivity to the data presentation upon being displayed at another client, the message may further include metadata associated with the data presentation. For instance, the metadata may include the query (e.g., a natural language query, a structured query language (SQL) query, and/or the like) associated with the data presentation as well as identifiers for one or more sources of the underlying data at the cloud-based analytics engine. Alternatively and/or additionally, the metadata may include a reference to the cloud-based analytics engine such as, for example, a uniform resource identifier (URI), a uniform resource locator (URL), a uniform resource name (URN), and/or the like. The metadata may lend interactivity to the data presentation displayed at the other client by at least enabling the other client to access, at the cloud-based analytics engine, the data used to create the data presentation including the history of the modifications made to the data presentation.

In some example embodiments, the other client may include software that enables the user at the other client to interact with the data presentation displayed at the other client. For example, the other client may include a same plugin that is launched when the user at the other client selects the data presentation including, for example, by at least clicking on the image of the data presentation included in the message. As noted, the plugin may be a software add-on to the application associated with the cloud-based analytics engine. The plugin at the other client may therefore also detect and respond to events that require interaction with the cloud-based analytics engine such as the user at the other client interacting with the data presentation included in the message. For example, the plugin may be launched at the other client in response to the user at the other client selecting the data presentation included in the message. Alternatively and/or additionally, the plugin may detect when the user at the other client selects the data presentation. Once launched, the plugin may enable the user at the other client to interact with the data presentation including by accessing the cloud-based analytics engine to retrieve, from the database associated with the cloud-based analytics engine, the data used to create the data presentation. For instance, the plugin may be configured to access, based at least on the metadata included with the data presentation, the data used to create the data presentation. By retrieving the data used to create the data presentation, the plugin may be able to recreate, for display at the other client, the same data presentation. Furthermore, the plugin may enable the user at the other client to apply one or more modifications to the data presentation displayed at the other client including, for example, changes to the measures, dimensions, type of data presentation, filters, and/or sort order associated with the data presentation.

FIG. 1 depicts a system diagram illustrating an analytics system 100, in accordance with some example embodiments. Referring to FIG. 1, the analytics system 100 may include an analytics engine 110, a first client 120a, a second client 120b, and a database 140. As shown in FIG. 1, the analytics engine 110, the first client 120a, the second client 120b, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like.

In some example embodiments, the first client 120a may interact with the analytics engine 110 in order to access the database 140, for example, to insert and/or retrieve data from the database 140. As shown in FIG. 1, the first client 120a may include a first plugin 160a configured to create a dataset that includes data extracted from a third party source 150. The first plugin 160a may be a software add-on to an application associated with the analytics engine 110. For example, the application associated with the analytics engine 110 may be installed on an operating system at the first client 120a or a web browser at the first client 120a (e.g., a web application). One or more functionalities of the analytics engine 110 may be accessible to the first user 125a.

In some example embodiments, the first plugin 160a may provide one or more additional features to the application including, for example, detecting and respond to events at the first client 120a that may require interaction with the analytics engine 110. In doing so, the first plugin 160a may obviate a first user 125a at the first client 120a from having to access the application in order to interact with the analytics engine 110. Instead, the first plugin 160a may detect one or more actions performed by the first user 125a and respond to these actions by at least interacting with the analytics engine 110.

In the example shown in FIG. 1, the first plugin 160a may create the dataset to include data extracted from a content 155 served to the first client 120a from the third party source 150. It should be appreciated that the first plugin 160a may be configured to extract data from any type of content available from a variety of third party sources including, for example, webpages, documents, files, directories, and/or the like.

Referring again to FIG. 1, the first plugin 160a may be configured to extract, from the content 155, structured data residing in a fixed field within a record or a field as well as semi-structured that are not organized in accordance to a data model. Examples of structure data include data in relational databases and/or spreadsheets while examples of unstructured data include data having tags for separating semantic elements and/or to enforce hierarchies within the data (e.g., hypertext markup language (HTML) documents and/or the like). The first plugin 160a may export the dataset including the data extracted from the content 155 to the database 140 such that the same dataset may be accessible to, for example, the second client 120b, via the analytics engine 110.

Figure 2A:
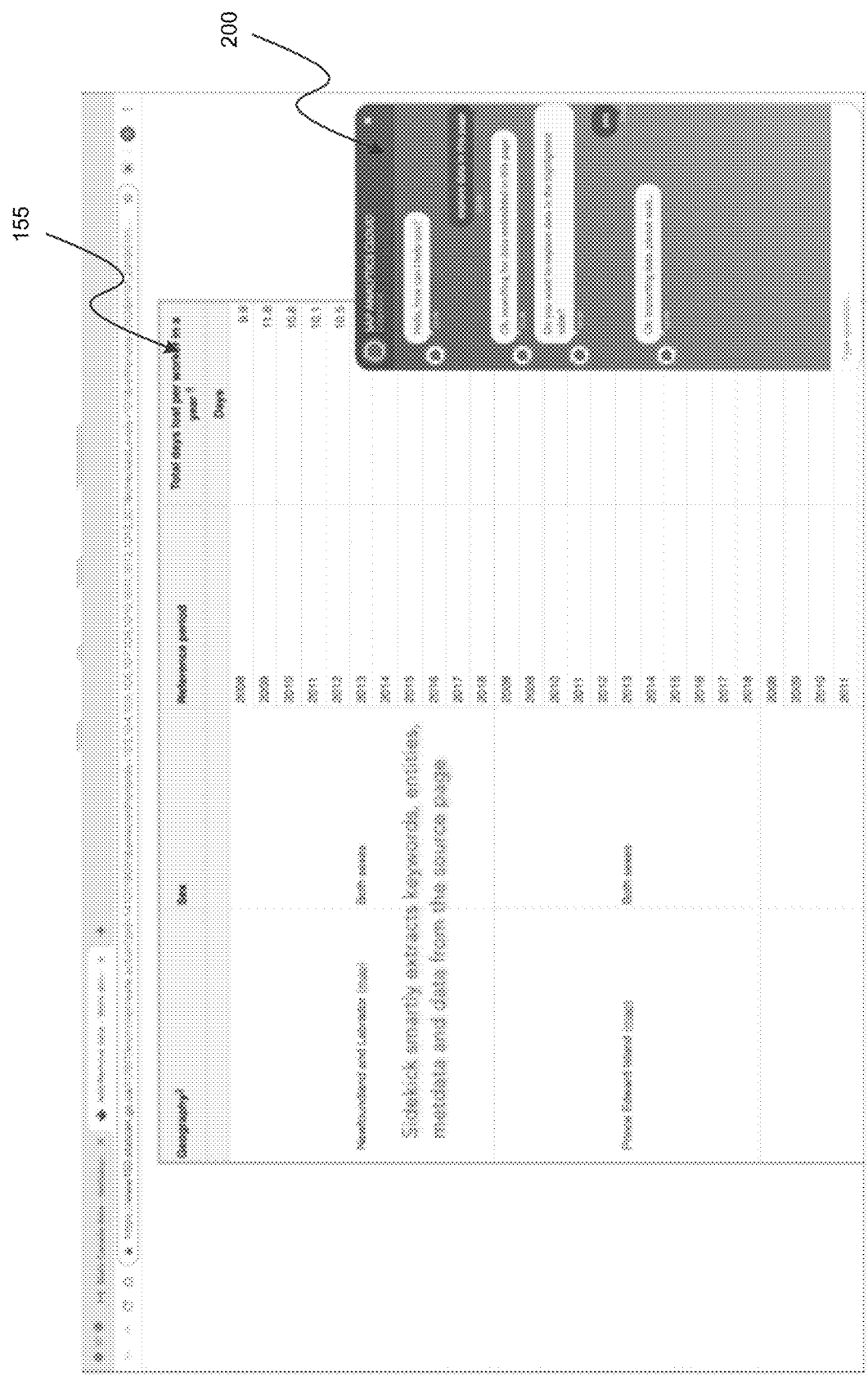
FIG. 2A depicts an example of a user interface, in accordance with some example embodiments.

To further illustrate, FIG. 2A depicts an example a use interface 200 associated the first plugin 160a, in accordance with some example embodiments. As shown in FIG. 2A, the user interface 200 may be configured to receive, from the first user 125a at the first client 120a, one or more requests to extract data from the content 155. For example, the first plugin 160a may generate the user interface 200 to include inquiries configured to prompt one or more inputs from the first user 125a including the request to extract data from a specific portion (e.g., a highlighted portion) of the content 155.

In some example embodiments, the first plugin 160a may be configured to generate the dataset to include a variety of data from the content 155, for example, keywords, named entities, custom entities, intent, data values, metadata, and/or the like. For example, in order to create the dataset with data from the content 155, the first plugin 160a may be configured to identify structured data and/or semi-structured data included in the content 155. Moreover, the first plugin 160a may infer metadata associated with the content 155 such as, for example, the data types of the structured data and/or semi-structured data extracted from the content 155.

According to some example embodiments, the first plugin 160a may apply one or more machine learning models trained to detect entities included in the content 155 including, for example, named entities, custom entities (e.g., domain specific named entities), and/or the like. Alternatively and/or additionally, the first plugin 160a may apply one or more machine learning models trained to determine, based on one or more of the entities included in the content 155, an intent associated with the content 155. As used herein, an entity may refer an object (or an instance of an object) that may be denoted with a proper name such as, for example, a person, a location, an organization, a product, and/or the like. The first plugin 160a may apply one or more machine learning models that have been jointly trained to identify entities included in the content 155 and the intent of the content 155. Examples of the one or more machine learning models include a support vector machine (SVM), a neural network, a maximum entropy Markov model (MEMM), a conditional random fields (CRF) model, an attention-based bidirectional neural network, and/or the like.

In some example embodiments, the first plugin 160a may generate another user interface, which may be presented at the first client 120a to enable the first user 125a to interact with the analytics engine 110. The first user 125a may interact with the analytics engine 110 to access data stored in the database 140 including the data extracted from the content 155 associated with the third party source 150. For example, the user interface may display, for example, a selection of queries (e.g., natural language queries, structured query language (SQL) queries, and/or the like) for retrieving and/or manipulating at least a portion of the data stored in the database 140.

In response to the first user 125a selecting a query, the first plugin 160a may execute the query to retrieve, from the database 140, at least a portion of the data stored in the database 140 including, for example, the data extracted from the content 155 associated with the third party source 150. Moreover, the first plugin 160a may update the user interface to display, at the first client 120a, a data presentation 170 generated based on the data retrieved from the database 140. The data presentation 170 may be a chart, a graph, a table, a diagram, and/or the like, that provides a visual representation of at least a portion of the data stored in the database 140 including, for example, the data extracted from the content 155 associated with the third party source 150. Moreover, the data presentation 170 may be associated with the query executed by the first plugin 160a to retrieve the underlying data. For instance, the first plugin 160a may designate the query as the name of the data presentation 170.

In some example embodiments, the first user 125a may modify the data presentation 170 such as, for example, the measures, dimensions, type of data presentation, filters, and/or sort order associated with the data presentation 170. A history of the data presentation 170, which include the modifications applied to the data presentation 170 by at least the first user 125a at the first client 120a, may be maintained by the first plugin 160a and saved to the analytics engine 110 for subsequent sharing with other users such as, for example, a second user 125b at the second client 120b. For example, the history of the data presentation 170 may be saved, to the analytics engine 110, at periodic time intervals.

Figure 2B:
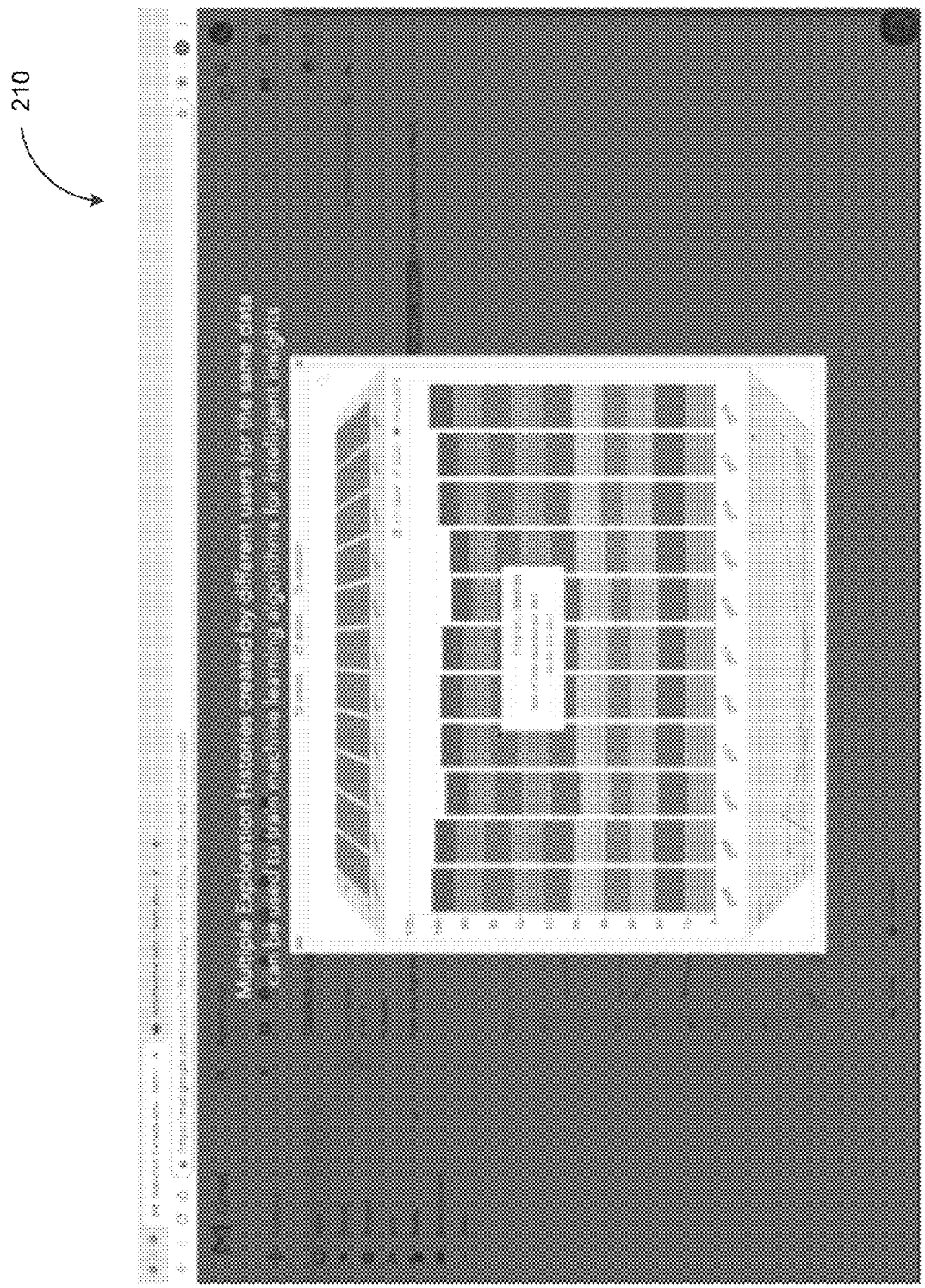
FIG. 2B depicts another example of a user interface, in accordance with some example embodiments.

To further illustrate, FIG. 2B depicts an example of a user interface 210, which displays a history of the data presentation 170 including the modifications that the first user 125a applied to the data presentation 170. It should be appreciated that analytics engine 110 may train, based at least on the history of the data presentation 170, one or more machine learning models to provide insight to the data stored at the database 140. For example, the one or more machine learning models may be trained, based at least on the history of the data presentation 170, to generate queries that are capable of retrieving, from the database 140, a selection of data that is consistent with what the first user 125a (and/or other similar users) wants to retrieve from the database 140. Alternatively and/or additionally, the one or more machine learning models may be trained, based at least on the history of the data presentation 170, to recommend actions for generating subsequent data presentations that are consistent with what the first user 125a (and/or other similar users) wants to generate.

In some example embodiments, the first user 125a may share, with the second user 125b at the second client 120b, the data presentation 170 including the history of the data presentation 170. For example, the first user 125a at the first client 120a may send, to the second client 120b, the data presentation as part of a message such as, for example, an email, an in-app message, a web-based instant message, a multimedia message service (MMS) message, an enhanced messaging service (EMS) message, and/or the like. In order to send the data presentation 170 to the second client 120b, the first plugin 160a at the first client 120a may generate a package that includes an image of the data presentation 170 and metadata associated with the data presentation 170.

In some example embodiments, the metadata associated with the data presentation 170 may lend interactivity to the data presentation 170 displayed at the second client 120b. The metadata associated with the data presentation 170 may enable, for example, a second plugin 160b at the second client 120b to recreate, for display at the second client 120b, the same data presentation 170. Moreover, the metadata associated with the data presentation 170 may enable the second user 125b at the second client 120b to interact with the data presentation 170 displayed at the second client 120b by at least providing, to the second client 120b, access to the underlying data stored at the database 140.

For example, the metadata may include the query (e.g., a natural language query, a structured query language (SQL) query, and/or the like) associated with the data presentation 170. The second plugin 160b at the second client 120b may execute the query to retrieve, from the database 140, the data used to generate the data presentation 170. The metadata may also include identifiers for one or more sources of the data used to create the data presentation 170. For instance, the metadata may include an identifier associated with the database 140 which, as noted, may store the data used to create the data presentation 170. Alternatively and/or additionally, the metadata may include a reference to the analytics engine 110 such as, for example, a uniform resource identifier (URI), a uniform resource locator (URL), a uniform resource name (URN), and/or the like. In the event the data presentation 170 is generated based on at least a portion of the data extracted from the content 155, the metadata may further include an identifier associated with the third party source 150.

In some example embodiments, the metadata associated with the data presentation 170 may enable the second plugin 160b at the second client 120b to establish a connection to the analytics engine 110 before executing the query to retrieve, from the database 140, data for recreating the data presentation 170 for display at the second client 120b. By having access to the same data that was used to create the data presentation 170 at the first client 120a, the data presentation 170 recreated at the second client 120b may be interactive. Accordingly, the second user 125b may apply one or more modifications to the data presentation 170 displayed at the second client 120b. For example, the second user 125b may apply one or more filters for selectively removing at least a portion of the underlying data. The second plugin 160b at the second client 120b may continue to track the modifications applied to the data presentation 170 including by making periodic updates to the history of the data presentation 170. As noted, the history of the data presentation 170 may be saved to the analytics engine 110 to enable subsequent sharing with other users.

It should be appreciated that the second plugin 160b may be a software add-on to the application associated with the analytics engine 110 that is configured to detect and respond to events at the second client 120b that may require interaction with the analytics engine 110. The second plugin 160b may obviate the second user 125b at the second client 120b from having to access the application in order to interact with the analytics engine 110. Instead, the second plugin 160b may detect one or more actions performed by the second user 125b and respond to these actions by at least interacting with the analytics engine 110. For instance, as noted, the second plugin 160b may detect the second user 125b selecting the data presentation 170 by at least accessing the analytics engine 110 to retrieve, from the database 140, data for recreating the data presentation 170 for display at the second client 120b.

In some example embodiments, the first plugin 160a may be configured to authenticate the first user 125a and the second plugin 160b may be configured to authenticate the second user 125b. This authentication may be performed prior to accessing, at the analytics engine 110, at least the portion of the data stored at the database 140 used to create the data presentation 170. Moreover, this authentication may be performed based on one or more credentials associated with the analytics engine 110 including, for example, a username, a password, and/or the like. The first plugin 160a and the second plugin 160b may query the analytics engine 110 upon successfully authenticating the first user 125a at the first client 120a and/or the second user 125b at the second client 120b.

In some example embodiments, the first plugin 160a and the second plugin 160b may be configured to adapt the queries sent to the analytics engine 110 based on the respective capabilities of the first client 120a and the second client 120b such as, for example, the ability to process hypertext markup language (HTML) data, image data, text data, voice data, and/or the like. The first plugin 160a and the second plugin 160b may adapt the queries in order to ensure that the type of data retrieved from the database 140 is suitable for each of the first client 120a and the second client 120b. For example, the first plugin 160a may adapt the query sent to the analytics engine 110 to retrieve the data presentation 170 rendered as a high definition scalable vector graphics (SVG) image (instead of a portable network graphics (PNG) image) if the first plugin 160a determines that the data presentation 170 is being displayed as part of a presentation application (and not web-based instant messaging application).

Figure 2C:
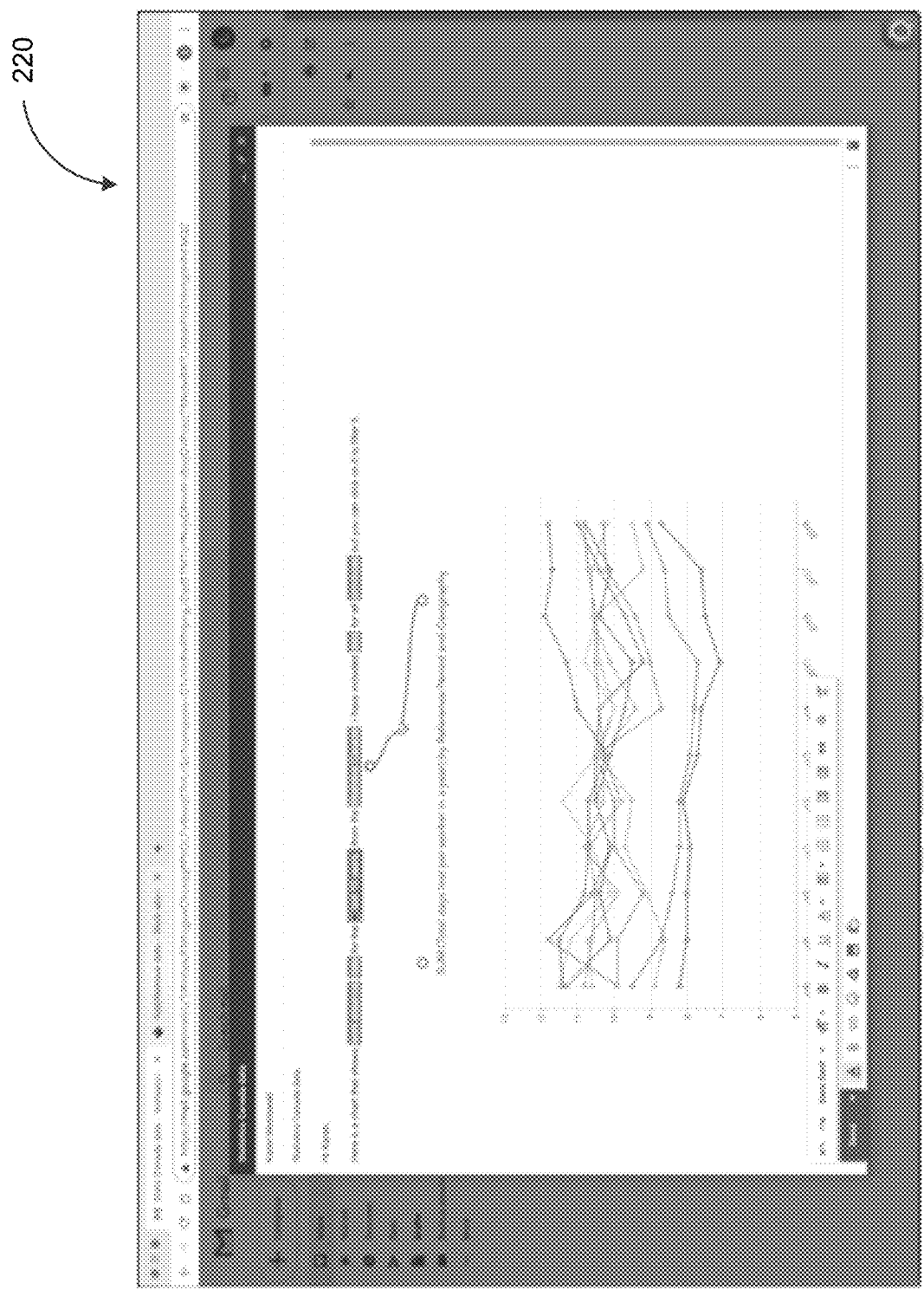
FIG. 2C depicts another example of a user interface, in accordance with some example embodiments.

To further illustrate, FIG. 2C depicts an example of a user interface 220 for generating a message including the data presentation 170. In the example shown in FIG. 2C, the first user 125a at the first client 120a may compose an email that includes the data presentation 170. In some example embodiments, the first plugin 160a at the first client 120a may generate the data presentation 170 including by interacting with the analytics engine 110 to fetch the data associated with the data presentation 170. The first user 125a may compose the email (or another type of message) by at least dragging the data presentation 170 from a user interface associated with the first plugin 160a to an email client.

In response to the data presentation 170 being added to the email, the first plugin 160a may be configured to detect the keywords and entities (e.g., named entities, custom entities, and/or the like) included in the text of the email. For example, the first plugin 160a may recognize the phrase "last 10 years" in the text of the email as a time dimension included in the data presentation 170. The first plugin 160a may visually highlight the keywords and/or the entities that are present in the text of the email and further link these keywords and/or entities to the data used to generate the data presentation 170. Some of the links may also be established based on inputs received from the first user 125a at the first client 120a.

By linking the text of the email to the data associated with the data presentation 170, the first plugin 160a may enable the first user 125a to modify the data presentation 170 by at least modifying the values of the keywords and/or entities present in the text of the email. For instance, the first user 125a may modify the text of the email to narrow (or broaden) the geographic scope of the data included in the data presentation 170 by modifying the value of a keyword in the text of the email that has been linked to a geographic dimension of the underlying data. In the example shown in FIG. 2C, the first plugin 160a may generate an interactive user interface that is overlaid over the data presentation 170 as well as the email to enable the first user 125a to modify the data presentation 170. Moreover, it should be appreciated that the interactive user interface may present, to the first user 125a, a predetermined selection of alternate values for each of the linked keywords and/or entities included in the text of the email. For example, the first user 125a may modify the geographic scope of the data included in the data presentation 170 by selecting, from a drop down menu (or another graphic user interface element) one of a plurality of specific provinces (e.g., Alberta, British Columbia, Manitoba, New Brunswick, Newfoundland and Labrador, Nova Scotia, Ontario, and/or the like).

Figure 2D:
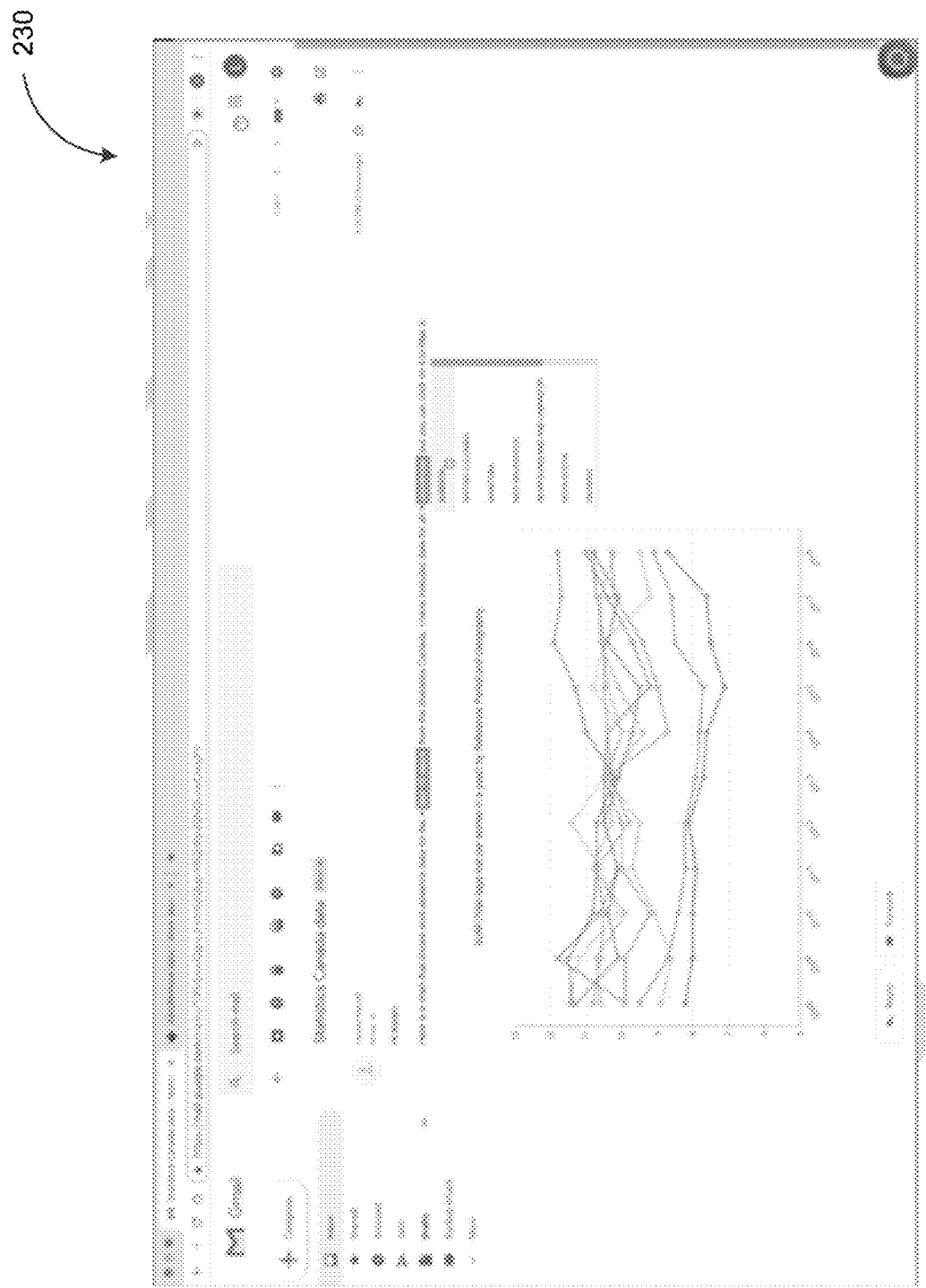
FIG. 2D depicts another example of a user interface, in accordance with some example embodiments.

As noted, in order to send the data presentation 170 to the second client 120b, the first plugin 160a at the first client 120a may generate a package that includes an image of the data presentation 170 and metadata associated with the data presentation 170. FIG. 2D depicts an example of a user interface 230 displaying a message received at the second client 120b, which may include the data presentation 170. In the example shown in FIG. 2D, the second user 125b at the second client 120b may receive, from the first user 125a at the first client 120a, an email message including the data presentation 170 as well as the metadata associated with the data presentation 170.

In some example embodiments, the second user 125b may launch the second plugin 160b at the second client 120b by at least selecting the image of the data presentation 170 included in the email received from the first user 125a at the first client 120a. Launching the second plugin 160b at the second client 120b may lend interactivity to the data presentation 170 displayed at the second client 120b. That is, the second plugin 160b may modify, based on inputs received from the second user 125b, the data presentation 170 displayed at the second client 120b. For example, the second plugin 160b may reactivate, based at least on the metadata associated with the data presentation 170, the links between the keywords and/or entities included in the text of the email and the data associated with the data presentation 170. The activation may include visually highlighting the linked keywords and/or entities. Moreover, activating the linked keywords and/or entities may enable the second user 125b at the second client 120b to further modify the data presentation 170 by changing the values of the linked keywords and/or entities included in the text of the email. For example, the second user 125b may modify the geographic scope of the data included in the data presentation 170 by selecting, from a drop down menu (or another graphic user interface element) one of a plurality of specific provinces (e.g., Alberta, British Columbia, Manitoba, New Brunswick, Newfoundland and Labrador, Nova Scotia, Ontario, and/or the like).

Figure 2E:
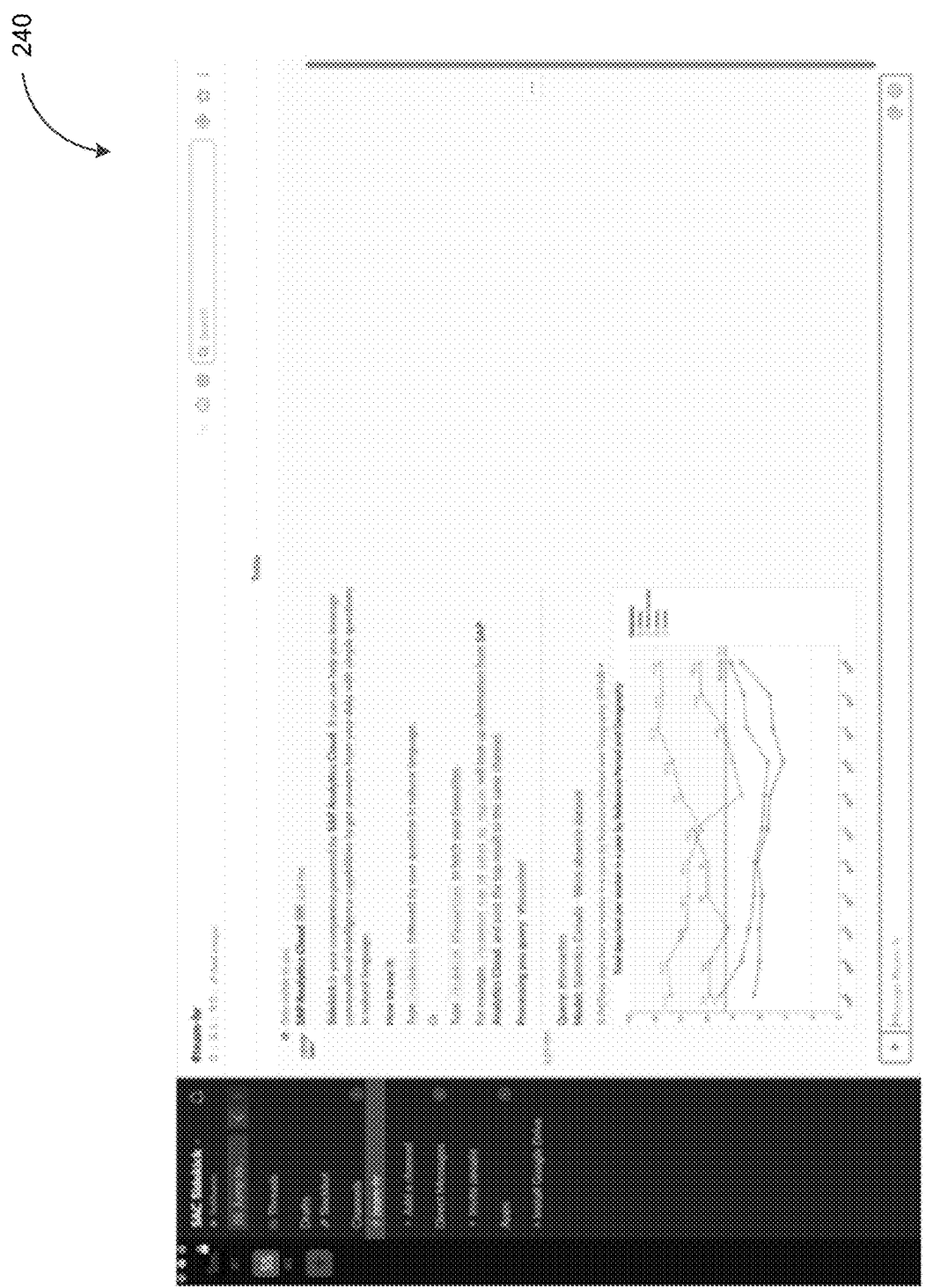
FIG. 2E depicts another example of a user interface, in accordance with some example embodiments.
Figure 2F:
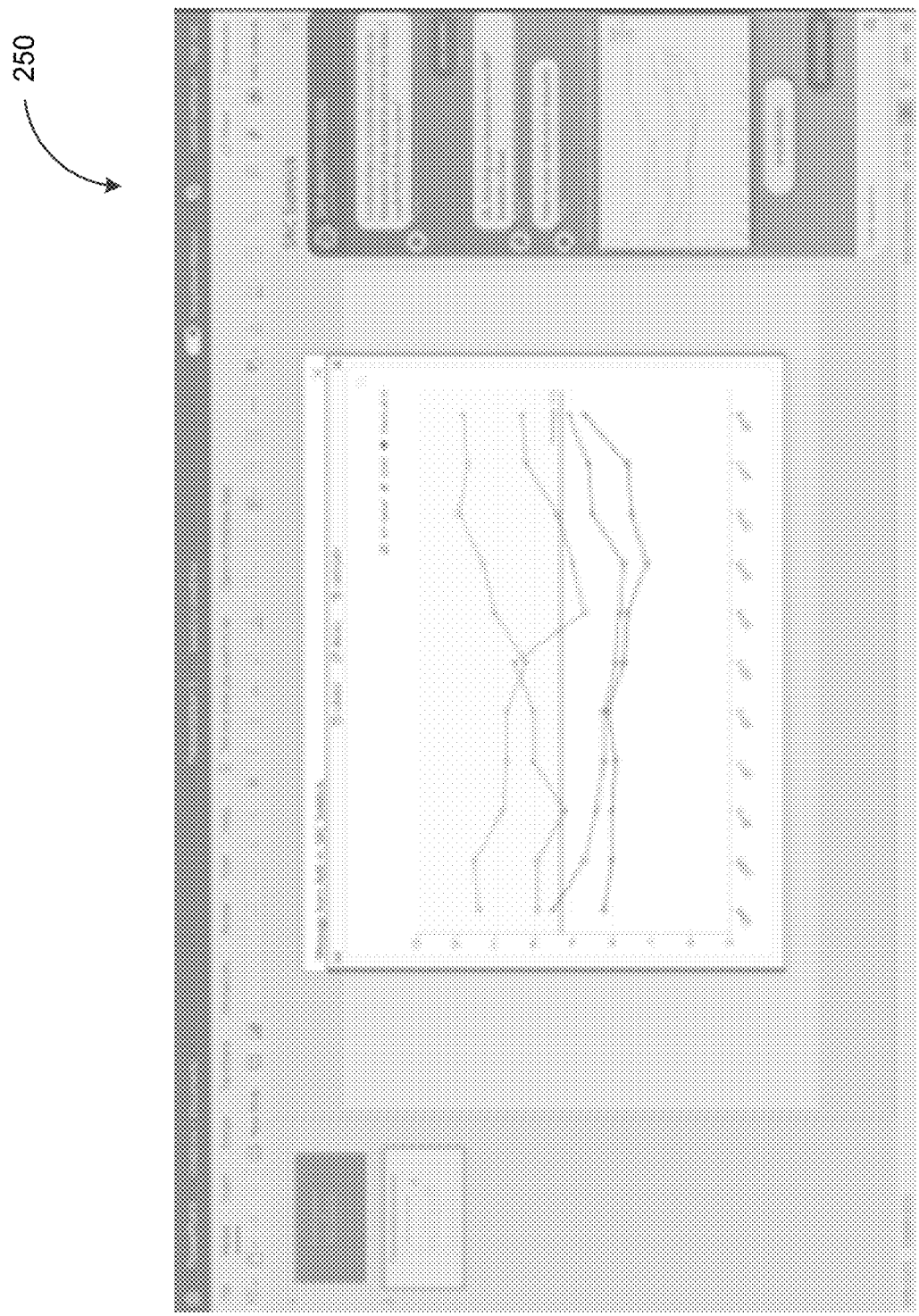
FIG. 2F depicts another example of a user interface, in accordance with some example embodiments.

In some example embodiments, the second plugin 160b may enable the second user 125b to modify the data presentation 170 by at least generating a user interface that is overlaid over the data presentation 170 and the text of the email including the data presentation 170. Alternatively, the second plugin 160b may generate a separate user interface that enables the second user 125b to modify the data presentation 170 including by modifying, for example, the measures, dimensions, type of data presentation, filters, and/or sort order associated with the data presentation 170. Moreover, the second plugin 160b may enable the second user 125b to insert the data presentation 170 into another application and apply additional modifications to the data presentation 170 in the context of the other application. For example, FIG. 2E depicts an example of a user interface 240 in which the second plugin 160b enables the second user 125b to interact with the data presentation 170 as part of a web-based instant message service application. FIG. 2F depicts an example of a user interface 250 in which the second plugin 160b enables the second user 125b to interact with the data presentation 170 as part of a document editor (e.g., a presentation application).

Figure 3:
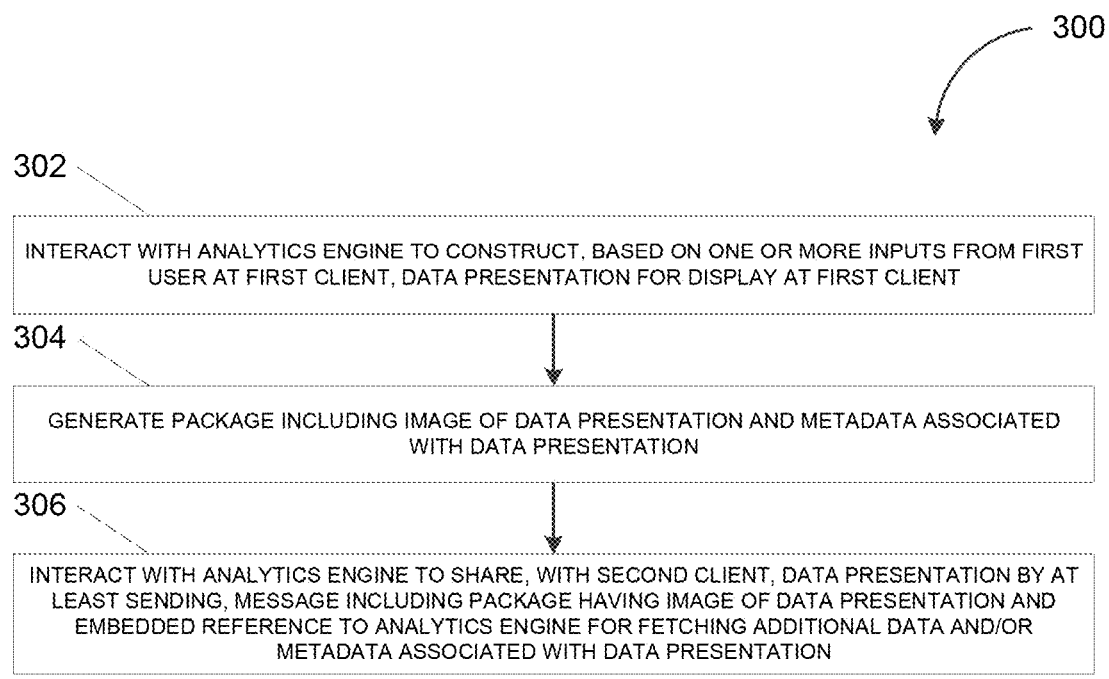
FIG. 3 depicts a flowchart illustrating a process for sharing access to data from a cloud-based analytics engine, in accordance with some example embodiments.

FIG. 3 depicts a flowchart illustrating a process 300 for sharing access to data from a cloud-based analytics engine, in accordance with some example embodiments. Referring to FIGS. 1, 2A-F, and 3, the process 300 may be performed at the first client 120a in order to share, with the second client 120b, the data presentation 170 providing a visual representation of at least a portion of the data stored in the database 140.

At 302, the first plugin 160a at the first client 120a may interact with the analytics engine 110 to construct, based on one or more inputs from the first user 125a at the first client 120a, the data presentation 170 for display at the first client 120a. In some example embodiments, the first plugin 160a at the first client 120a may interact with the analytics engine 110 in order to access data stored in the database 140. For example, the first plugin 160a may receive, from the first user 125a at the first client 120a, one or more inputs requesting to construct the data presentation 170 to provide a visual representation of at least a portion of the data stored in the database 140. The first plugin 160a may further generate, based at least on the data retrieved from the database 140, the data presentation 170 for display at the first client 120*a*. The first user 125*a* at the first client 120*a* may apply one or more modifications to the data presentation 170 including, for example, adding and/or removing portions of data used to generate the data presentation 170.

At 304, the first plugin 160*a* at the first client 120*a* may generate a package including an image of the data presentation 170 and metadata associated with the data presentation 170. In some example embodiments, the first client 120*a* may generate the package including the image of the data presentation 170 and metadata associated with the data presentation 170 in order to send the data presentation 170 to the analytics engine 110 that the second user 125*b* at the second client 120*b* can access. The metadata associated with the data presentation 170 may lend interactivity to the data presentation 170 when the data presentation 170 is recreated for display at the second client 120*b*. For example, the metadata associated with the data presentation 170 may enable the second user 125*b* at the second client 120*b* to interact with the data presentation 170 displayed at the second client 120*b* by at least providing, to the second plugin 160*b* at the second client 120*b*, access to the data used to create the data presentation 170.

In some example embodiments, the metadata associated with the data presentation 170 may include the query (e.g., a natural language query, a structured query language (SQL) query, and/or the like) that is used to retrieve, from the database 140, the data used to generate the data presentation 170. The metadata associated with the data presentation 170 may also include identifiers for one or more sources of the data used to create the data presentation 170. For instance, the metadata may include an identifier associated with the database 140 storing the data used to create the data presentation 170. Alternatively and/or additionally, the metadata associated with the data presentation 170 may include a reference to the analytics engine 110 including, for example, a uniform resource identifier (URI), a uniform resource locator (URL), a uniform resource name (URN), and/or the like. In the event the data presentation 170 is generated based on at least a portion of the data extracted from the content 155, the metadata may further include an identifier associated with the third party source 150.

At 306, the first client 120*a* may interact with the analytics engine 110 in order to share, with the second client 120*b*, the data presentation 170 including by sending, to the second client 120*b*, a message including the package having the image of the data presentation 170 and embedded reference to the analytics engine 110 for fetching additional data and/or metadata associated with the data presentation 170. For example, the metadata associated with the data presentation 170 may enable the second plugin 160*b* at the second client 120*b* to establish a connection to the analytics engine 110 before executing the same query to retrieve, from the database 140, the data that was used to generate the data presentation 170. The data presentation 170 may be recreated, based at least on the data retrieved from the database 140, for display at the second client 120*b*. By having access to the same data that was used to create the data presentation 170 at the first client 120*a*, the data presentation 170 recreated at the second client 120*b* may be interactive. Accordingly, the second user 125*b* may apply further modifications to the data presentation 170 displayed at the second client 120*b*. For example, the second user 125*b* may change the measures, dimensions, type of data presentation, filters, and/or sort order associated with the data presentation.

Figure 4:
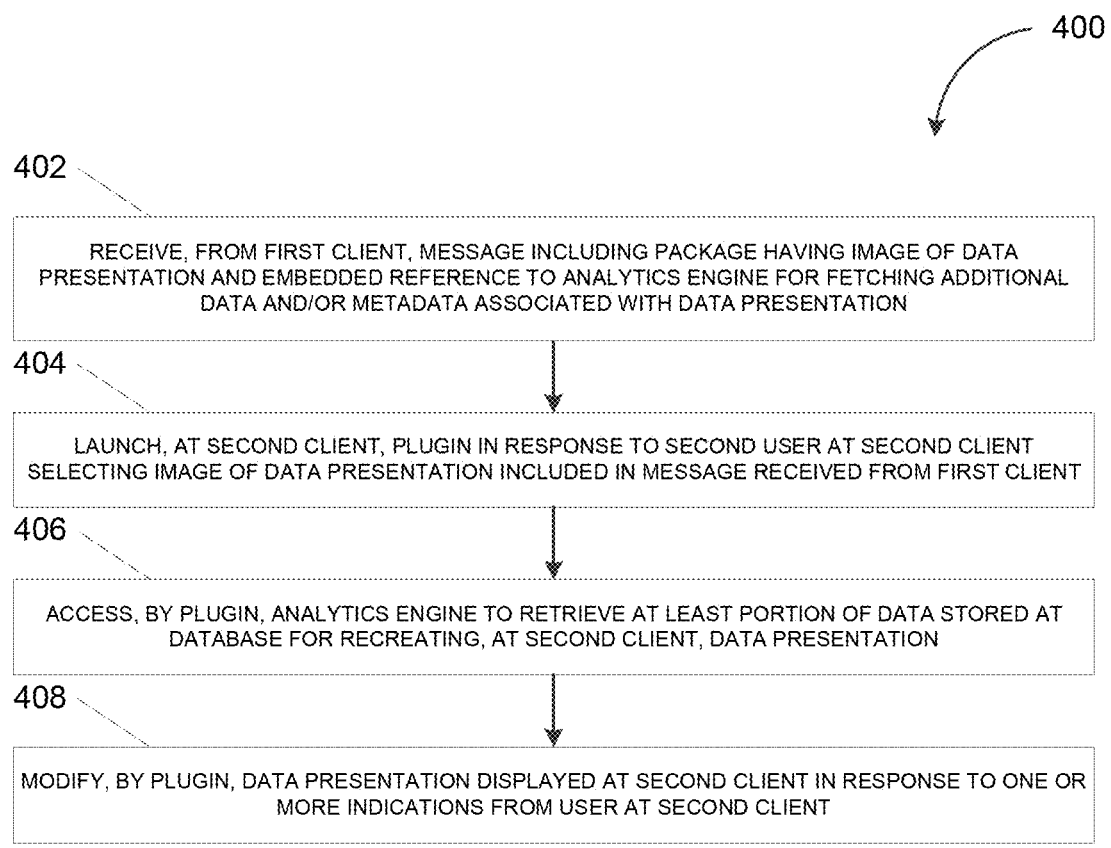
FIG. 4 depicts a flowchart illustrating a process for sharing access to data from a cloud-based analytics engine, in accordance with some example embodiments.

FIG. 4 depicts a flowchart illustrating a process 400 for sharing access to data from a cloud-based analytics engine, in accordance with some example embodiments. Referring to FIGS. 1, 2A-F, and 4, the process 400 may be performed at the second client 120*b* in order to recreate, for display at the second client 120*b*, the data presentation 170. As noted, the data presentation 170 that is recreated at the second client 120*b* may be interactive such that the second user 125*b* at the second client 120*b* may apply, to the data presentation 170 displayed at the second client 120*b*, one or more modifications changing, for example, the measures, dimensions, type of data presentation, filters, and/or sort order associated with the data presentation.

At 402, the second client 120*b* may receive, from the first client 120*a*, a message including a package having an image of the data presentation 170 and an embedded reference to the analytics engine 110 for fetching additional data and/or metadata associated with the data presentation 170. As noted, in some example embodiments, the first client 120*a* may generate the package including the image of the data presentation 170 and metadata associated with the data presentation 170 in order to send the data presentation 170 to one or more clients such as, for example, the second client 120*b*. The metadata associated with the data presentation 170 may lend interactivity to the data presentation 170 displayed at the second client 120*b*. For example, the metadata associated with the data presentation 170 may enable the second user 125*b* at the second client 120*b* to interact with the data presentation 170 displayed at the second client 120*b* by at least providing, to the second client 120*b*, access to the data used to create the data presentation 170.

At 404, the second plugin 160*b* may be launched at the second client 120*b* in response to the second user 125*b* at the second client 120*b* selecting the image of the data presentation 170 included in the message received from the first client 120*a*. In some example embodiments, the second client 120*b* may include the second plugin 160*b*, which may enable the second user 125*b* at the second client 120*b* to interact with the data presentation 170 displayed at the second client 120*b*. For example, the second plugin 160*b* may be a software component configured to add, to a computer program at the second client 120*b*, one or more features such as, for example, the ability to interact with the data presentation 170. The second plugin 160*b* may be launched at the second client 120*b* in response to the second user 125*b* selecting the data presentation 170. Moreover, the second plugin 160*b* may enable the second user 125*b* to interact with the data presentation 170 displayed at the second client 120*b* by at least interacting with the analytics engine 110 to retrieve, from the database, the data used to create the data presentation 170. For instance, the second plugin 160*b* may access, based at least on the metadata associated with the data presentation 170, at least the portion of the data stored at the database 140 used to create the data presentation 170.

At 406, the second plugin 160*b* may access the analytics engine 110 to retrieve at least portion of data stored at the database 140 for recreating, at the second client 120*b*, the data presentation 170. For example, in some example embodiments, the second plugin 160*b* may be configured to authenticate the second user 125*b* prior to accessing, at the analytics engine 110, at least the portion of the data stored at the database 140 used to create the data presentation 170. The second plugin 160*b* may prompt the second user 125*b* to input one or more credentials associated with the analytics engine 110 including, for example, a username, a password, and/or the like. The second plugin 160b may retrieve at least the portion of the data stored at the database 140 in response to the second user 125b being successfully authenticated based on the one or more credentials.

At 408, the second plugin 160b may modify the data presentation 170 displayed at the second client 120b in response to one or more indications from the second user 125b at the second client 120b. As noted, in some example embodiments, the metadata associated with the data presentation 170 may enable the second client 120b to establish a connection to the analytics engine 110 before executing the query to retrieve, from the database 140, data for recreating the data presentation 170 for display at the second client 120b. By having access to the same data that was used to create the data presentation 170 at the first client 120a, the data presentation 170 recreated at the second client 120b may be interactive. Accordingly, the second plugin 160b may apply, in accordance to inputs from the second user 125b, one or more modifications to the data presentation 170 displayed at the second client 120b. For example, the second plugin 160b may apply one or more filters for selectively removing at least a portion of the underlying data.

Figure 5:
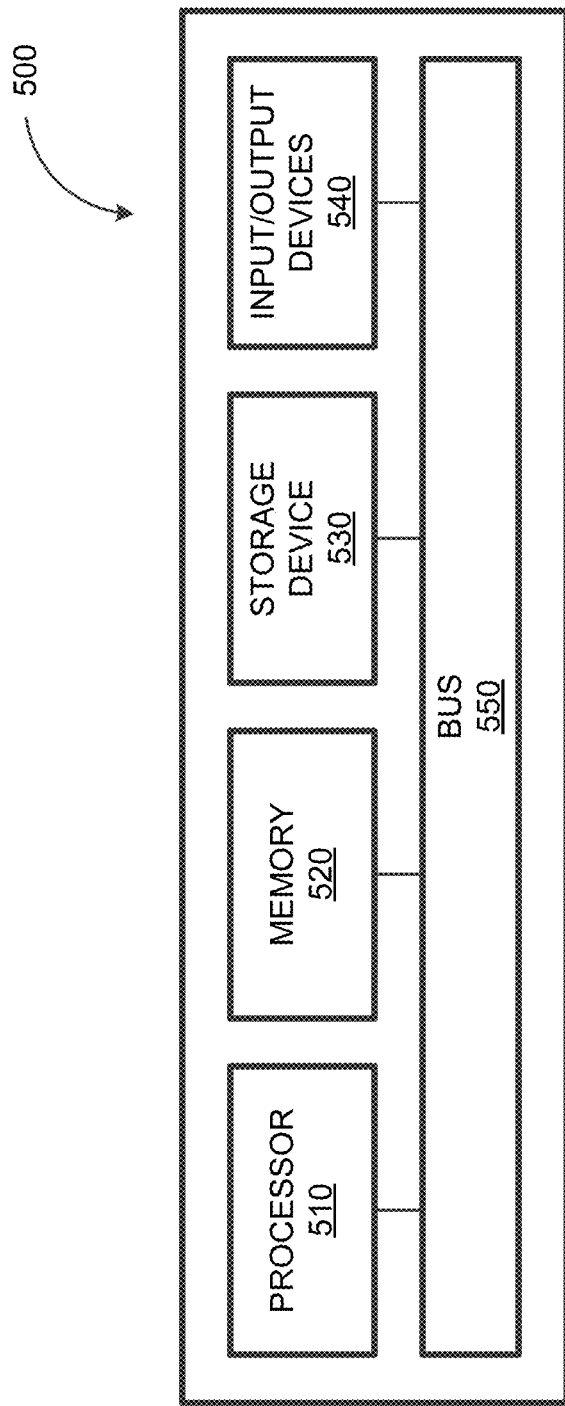
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the analytics engine 110, the first client 120a, the second client 120b, and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the analytics engine 110, the first client 120a, and/or the second client 120b. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        receiving, at a first client including a first plug-in associated with a cloud-based analytics engine, a message sent by a second client to the first client, the second client including a second plug-in associated with the cloud-based analytics engine, the message including an image of a data presentation and metadata associated with the data presentation, the received metadata enabling the first client including the first plug-in to access at least the cloud-based analytics engine to retrieve a same data used to generate the data presentation at the second client, wherein the metadata includes a database query for the data, a modification history indicating at least a first modification, by the second client which includes the second plug-in, to the data presentation, and a location of the cloud-based analytics engine;
        responding, by the first client including the first plug-in associated with the cloud-based analytics engine, to a selection of the image of the data presentation by at least accessing the cloud-based analytics engine to retrieve at least a portion of the data associated with the data presentation, wherein the cloud-based analytics engine and the database are accessed based at least on the received metadata including the database query associated with the data presentation; and
        generating, by the first client including the first plug-in and based at least on the data retrieved from the cloud-based analytics engine using the received metadata from the second client including the second plug-in, the data presentation for display at the first client, the data presentation includes the same data used to generate the data presentation at the second client including the second plug-in associated with the cloud-based analytics engine, wherein the data presentation displayed at the first client is made interactive by at least applying the metadata including the modification history, which corresponds to modification performed at the second client, to the data presentation displayed at the first client.

2. The system of claim 1, wherein the data presentation is generated by the second plug-in at the second client, wherein the second plug-in detects interaction at the second client with a third-party data source, and in response to the detected interaction, the second plug-in extracts from the third party data source third party data and exports the third party data to the cloud-based analytics engine and to the database, such that a dataset comprising the third-party data and database object data provides, via the cloud-based analytics engine, the portion of data associated with the data presentation.

3. The system of claim 1, wherein the data presentation is generated at the second client including the second plug-in at least by executing the database query to retrieve, from the cloud-based analytics engine, at least the portion of the data associated with the data presentation.

4. The system of claim 1, wherein the data associated with the data presentation is stored in the database coupled with the cloud-based analytics engine, and wherein the metadata includes an identifier of the database.

5. The system of claim 1, wherein the location includes a uniform resource identifier (URI), a uniform resource locator (URL), and/or a uniform resource name (URN) of the cloud-based analytics engine.

6. The system of claim 1, wherein the first client includes a first plug-in configured to respond to the selection of the image of the data presentation by accessing the cloud-based analytics engine and generating the data presentation for display at the first client.

7. The system of claim 6, wherein the first plug-in is further configured to authenticate the first client and/or a user associated with the first client prior to accessing the cloud-based analytics engine to retrieve the portion of the data associated with the data presentation.

8. The system of claim 1, further comprising:
receiving, at the first client, an indication to apply the first modification to the data presentation displayed at the first client; and
responding to the indication by at least applying, to the data presentation displayed at the first client, the first modification.

9. The system of claim 8, further comprising:
sending, to the cloud-based analytics engine, the first modification such that a history of the data presentation is updated to include the first modification; and
displaying, at the first client, the history of the data presentation including the first modification and a second modification that a second user at the second client applied to the data presentation prior to sending the data presentation to the first client.

10. The system of claim 8, wherein the data presentation is associated with a title generated based at least on a database query configured to retrieve the data associated with the data presentation, and wherein the indication includes one or more modifications to the title of the data presentation.

11. The system of claim 10, wherein one or more dimensions included in the data presentation are linked to one or more keywords included in a text of the message, and wherein the one or more modification modify the one or more keywords linked to the one or more dimensions of the data presentation.

12. The system of claim 1, further comprising:
receiving, at the first client, a request to extract data from a content from a third party source;
responding to the request by at least extracting, from the content from the third party source, the data; and
exporting, to the cloud-based analytics engine, the extracted data.

13. The system of claim 12, wherein the extracted data includes one or more named entities included in the content from the third party source, and wherein the extracting of the data includes applying one or more machine learning models to identify the one or more named entities.

14. The system of claim 13, wherein the extracted data further includes an intent of the content from the third party source, and wherein the extracting of the data includes applying the one or more machine learning models to identify, based at least on the one or more named entities, the intent of the content from the third party source.

15. The system of claim 14, wherein the one or more machine learning model are jointly trained to identify the one or more named entities and the intent of the content from the third party source.

16. The system of claim 12, wherein the extracting of the data includes extracting one or more keywords present in the content from the third party source.

17. The system or claim 12, wherein the extracting of the data includes inferring a metadata associated with the content from the third party source.

18. The system of claim 12, wherein the extracting of the data includes extracting one or more data values from a structured data and/or a semi-structured data include in the content from the third party source.

19. A computer-implemented method, comprising:
receiving, at a first client including a first plug-in associated with a cloud-based analytics engine, a message sent by a second client to the first client, the second client including a second plug-in associated with the cloud-based analytics engine, the message including an image of a data presentation and metadata associated with the data presentation, the received metadata enabling the first client including the first plug-in to access at least the cloud-based analytics engine to retrieve a same data used to generate the data presentation at the second client, wherein the metadata includes a database query for the data, a modification history indicating at least a first modification, by the second client which includes the second plug-in, to the data presentation, and a location of the cloud-based analytics engine;
responding, by the first client including the first plug-in associated with the cloud-based analytics engine, to a selection of the image of the data presentation by at least accessing the cloud-based analytics engine to retrieve at least a portion of the data associated with the data presentation, wherein the cloud-based analytics engine and the database are accessed based at least on the received metadata including the database query associated with the data presentation; and
generating, by the first client including the first plug-in and based at least on the data retrieved from the cloud-based analytics engine using the received metadata from the second client including the second plug-in, the data presentation for display at the first client, the data presentation includes the same data used to generate the data presentation at the second client including the second plug-in associated with the cloud-based analytics engine, wherein the data presentation displayed at the first client is made interactive by at least applying the metadata including the modification history, which corresponds to modification performed at the second client, to the data presentation displayed at the first client.

20. A non-transitory computer-readable medium storing instructions, which when executed by at least one data processor, result in operations comprising:
receiving, at a first client including a first plug-in associated with a cloud-based analytics engine, a message sent by a second client to the first client, the second client including a second plug-in associated with the cloud-based analytics engine, the message including an image of a data presentation and metadata associated with the data presentation, the received metadata enabling the first client including the first plug-in to access at least the cloud-based analytics engine to retrieve a same data used to generate the data presentation at the second client, wherein the metadata includes a database query for the data, a modification history indicating at least a first modification, by the second client which includes the second plug-in, to the data presentation, and a location of the cloud-based analytics engine;
responding, by the first client including the first plug-in associated with the cloud-based analytics engine, to a selection of the image of the data presentation by at least accessing the cloud-based analytics engine to retrieve at least a portion of the data associated with the data presentation, wherein the cloud-based analytics engine and the database are accessed based at least on the received metadata including the database query associated with the data presentation; and
generating, by the first client including the first plug-in and based at least on the data retrieved from the cloud-based analytics engine using the received metadata from the second client including the second plug-in, the data presentation for display at the first client, the data presentation includes the same data used to generate the data presentation at the second client including the second plug-in associated with the cloud-based analytics engine, wherein the data presentation displayed at the first client is made interactive by at least applying the metadata including the modification history, which corresponds to modification performed at the second client, to the data presentation displayed at the first client.

* * * * *